S. A. WILLIAMS.
APPARATUS FOR MOLDING FIBER CEMENT CONCRETE BODIES CHARACTERIZED BY CURVED CROSS SECTION.
APPLICATION FILED JUNE 9, 1921.
1,435,906. Patented Nov. 14, 1922.
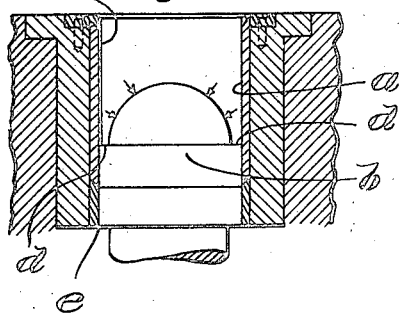
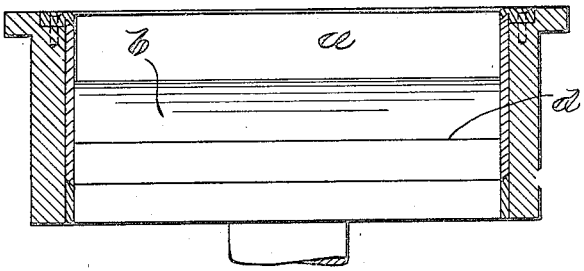
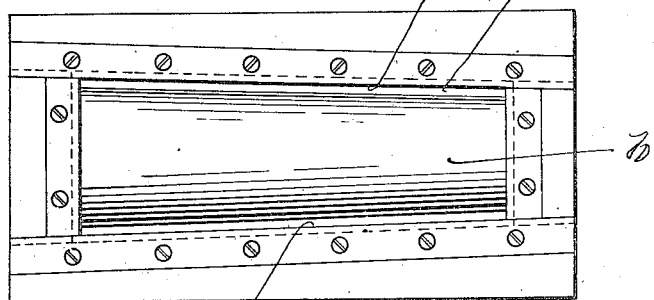
Inventor:
Samuel A. Williams Patented Nov. 14, 1922.

1,435,906

UNITED STATES PATENT OFFICE.

SAMUEL A. WILLIAMS, OF LOCKPORT, NEW YORK.

APPARATUS FOR MOLDING FIBER CEMENT CONCRETE BODIES CHARACTERIZED BY CURVED CROSS SECTION.

Application filed June 9, 1921. Serial No. 476,202.

*To all whom it may concern:*

Be it known that I, SAMUEL A. WILLIAMS, a subject of the King of Great Britain, and resident of Lockport, in the county of Niagara and State of New York, have invented new and useful Improvements in Apparatus for Molding Fiber Cement Concrete Bodies Characterized by Curved Cross Section, of which the following is a specification.

My invention relates to the art of forming pressure-molded articles of compounded fibrous and cementitious material, of which a mixture of short asbestos fiber, or asbestiform fiber produced by grinding serpentine, with a hydraulic cement, such as Portland cement, is the type. High pressure is required to produce dense and structurally strong slabs, sheets or blocks of such material; usually this pressure is applied to a wet mixture of the fiber and cement in a filter press; the product immediately after the molding operation is pliable, and has to be supported until the cement has set. The product known as asbestos wood is made in this manner. Heretofore, when curved-surfaced products of this character have been required, sheets of the composite material, fresh from the press, and therefore flexible, have been bent over forms, and allowed to set in the shape thus imparted. Attempts to mold bodies of such material in curved-surfaced filter presses have not met with success; in order to preserve the desired curved form, the molded body had to remain in the press until set, and the intimacy with which the molded material clung to the perforated or reticulated filter press plate made it next to impossible to remove the molded body without injury to it, or to the filter bed, or both.

There is frequent need for curved shapes of material of this character, as for ridge-caps which are used with asbestos shingle or tile, in roofing; and heretofore such trough-shaped bodies have been made by bending fresh or "green" composite asbestos fiber board over a form and allowing it to set in the shape imparted.

My invention has for its object the manufacture of curved-surfaced and concave-convex bodies of composite fiber and cement, represented by the asbestos fiber and hydraulic cement compositions, more expeditiously than formerly, and consists in a method of operation its product and an apparatus or mechanism by which the method can be performed. All will be herein described, and the apparatus is herein the subject of claim; the method and product are the subjects of claim in an application for United States Letters Patent filed by me concurrently herewith, serially numbered 476,201.

This method is applicable to the production of regularly or irregularly curved bodies, of cylindrical, or spherical, or spheroidal, or other curved surface. The mode of operation is best described with reference to a characteristic curvilinear cross section of the body to be molded, whether in three dimensions it be of cylindrical, spherical, or other curved surface.

In the drawings hereto annexed, which illustrate diagrammatically an apparatus with which my new method may be practiced;

Fig. 1 shows a mold and bottom convex die, in cross section;

Fig. 2, the same in longitudinal section;

Fig. 3, the same in plan view;

Fig. 4, the mold, bottom convex die, and tamping plunger, in cross section;

Fig. 5 the same, with the tamping plunger in operation in the fiber-concrete material;

Fig. 6, the mold, bottom and top dies, and material after compression, all in cross section;

Fig. 7, the bottom die in its elevated position, and the molded body ready to be removed, in cross section; and Fig. 8, a molded product, in perspective.

Suppose, for example, that the material to be molded consists of thoroughly mixed asbestos fiber (or ground serpentine), Portland cement, and that quantity of water which is the minimum requisite to set the cement, i. e. about fifteen per cent of the weight of the cement, and that the molding by pressure is to reduce the volume of the mixture to about one-third of its bulk in the loose, and that the characteristic cross-section of the final molded body is semi-circular, as indicated at M, in Fig. 6. This will be characteristic, whether the whole body be semi-cylindrical, or hemispherical, or conical, or conoidal, etc.

The mold comprises a box, with parallel vertical sides $a$, $a$, and a movable bottom-mold or die $b$. Under the assumption above made for example, the formation of a body of cross section (see material, M, Fig. 6) requires, theoretically, a compression, normal at all points to the curve of the die $b$, to reduce the bulk of material from the volume represented by the material $m$, Fig. 4, to that represented by the outline in section of the material M in Figs. 6 and 7. For obvious mechanical reasons, direct compression on normals represented by the arrows in Fig. 1 is impracticable. Indirectly and approximately, however, my method accomplishes the desired distribution and compression of material, and supplies practically and in a practical manner, the above indicated theoretical conditions.

With the sides $a$, $a$, and bottom $b$ of the mold in place as shown in Fig. 1, the composite of asbestos fiber, cement and water, thoroughly and intimately mixed, is charged into the mold to the level $l$, (Fig. 4). This material is by no means watery, it feels only slightly moist to the hand, and is sufficiently plastic to hold a shape imparted to it by light pressure. First, a side tamping plunger P, having sides $c$, $c$ is pressed down into the material $m$, and condenses the material adjacent to the mold-sides $a$, $a$, in column between the lower ends of the tamping plunger sides $c$, $c$, and the ledges $d$, $d$ of the mold-bottom. The tamping plunger is then withdrawn, leaving the material with a stepped outline. Thereupon the final pressing head or upper die $f$ is brought down on the material $m$. The curved concave side of this die $f$ carries the middle portion of the material down, compressing it in a direction normal to the crown of the mold-bottom $b$, and spreading material from the corners formed by the tamping plunger inward toward the center of curvature of the die surfaces, and downward toward the partly condensed material standing above the ledges $d$, $d$. The thin outer edges of the die $f$, which slide along the sides $a$, $a$, of the mold, increase the density of the preliminarily compressed portions of the material $m$, and press it toward the mold-bottom $b$, in a direction substantially normal to its surfaces adjacent to the ledges $d$, $d$. The material derived from the corner portions of this material, as formed by the tamping plunger, which is pressed downward toward the ledges $d$, $d$, increases the density of the material near and against these ledges. When full pressure is exerted on this molded material in the press the molded body assumes such a sufficiently firm consistency that it can be handled and discharged from the mold, even before the cement in the material has had time to set. The preferred mode of discharge is illustrated in Fig. 7 where, the mold die $f$ having been withdrawn, the mold-bottom $b$ is raised by its shaft $b'$ until the molded shape is clear of the sides $a$, $a$. Then the molded body (M, Fig. 8) can be lifted from the mold-bottom $b$, and laid aside until the cement has set.

The mold-bottom $b$, having a fairly close sliding fit with the mold sides, provides enough clearance at $e$, $e$, (Fig. 1) to allow for escape of air as the upper die $f$ descends. Air will also escape between the die $f$ and the mold-sides $a$, $a$.

By employing only so much water in the material which constitutes the fiber-cement concrete, as is necessary to set the current, smooth and continuous mold surfaces can be employed, since no expression of water by filtration is necessary. The molded shape readily disengages itself from the smooth surfaces of the mold members.

The press employed will preferably be a hydraulic press; the construction and design of such presses is well known to those skilled in the art to which my invention relates. For the sake of simplicity in description the details and mechanical adjuncts of such a press, designed for the operations here set forth, have been omitted.

I claim:

In molding-apparatus, the combination of a mold-box, a convex bottom mold member therein, a tamping plunger adapted to slidingly engage the sides of the box and condense material between the sides of the mold box and adjacent portions of the convex bottom mold member, and a concave upper mold member also adapted to slidingly engage the sides of the mold box and compress the material, including that previously condensed by the tamping plunger in directions substantially normal to the curved surface of the bottom mold member.

Signed by me at Boston, Massachusetts, this fourth day of June 1921.

SAMUEL A. WILLIAMS.